United States Patent
Lee

(10) Patent No.: US 7,358,621 B2
(45) Date of Patent: Apr. 15, 2008

(54) USING SOUND WAVES AND PHOTIC ENERGY FOR ELECTRIC POWER

(76) Inventor: Tseng-Shen Lee, No. 263, Jiansing Rd., Ren-he Village, Fangliao Township, Pingtung County (TW)

( * ) Notice: Subject to any disclaimer, the term of this patent is extended or adjusted under 35 U.S.C. 154(b) by 0 days.

(21) Appl. No.: 11/451,455

(22) Filed: Jun. 13, 2006

(65) Prior Publication Data
US 2007/0284887 A1 Dec. 13, 2007

(51) Int. Cl.
*H02J 7/00* (2006.01)
(52) U.S. Cl. ..................................... 290/1 R
(58) Field of Classification Search ............... 290/1 R
See application file for complete search history.

(56) References Cited

U.S. PATENT DOCUMENTS

| 3,281,567 A | * | 10/1966 | Meissner et al. | 219/709 |
| 3,980,855 A | * | 9/1976 | Boudouris et al. | 219/696 |
| 4,028,932 A | * | 6/1977 | Rosencwaig | 73/579 |
| 4,408,478 A | * | 10/1983 | Bechthold et al. | 73/24.02 |
| 5,051,066 A | * | 9/1991 | Lucas | 417/207 |
| 7,182,046 B2 | * | 2/2007 | Wade et al. | 123/27 R |
| 2002/0160717 A1 | * | 10/2002 | Persson et al. | 455/67.1 |
| 2004/0178702 A1 | * | 9/2004 | Bonne et al. | 310/339 |
| 2005/0210956 A1 | * | 9/2005 | Crane | 73/24.01 |
| 2006/0082158 A1 | * | 4/2006 | Schrader | 290/1 R |
| 2006/0113961 A1 | * | 6/2006 | Weng | 320/138 |
| 2006/0156999 A1 | * | 7/2006 | Wade et al. | 123/2 |
| 2007/0001541 A1 | * | 1/2007 | Baker, Jr. | 310/301 |
| 2007/0045244 A1 | * | 3/2007 | Lee et al. | 219/121.43 |

FOREIGN PATENT DOCUMENTS

JP  2001127325 A * 5/2001
WO  WO 0241467 A1 * 5/2002

* cited by examiner

*Primary Examiner*—Joseph Waks
(74) *Attorney, Agent, or Firm*—Rosenberg, Klein & Lee

(57) ABSTRACT

An electric power generating and gaining device using sound waves and photic energy to generate magnetism together using a crystal microphone device providing a metallic film with metallic coil leading wires to sense and receive the frequency of external sound waves and pressure to form a vibratile magnetic field (N and S poles), using the magnetic field and leading wire thereof and the leading wire and coil magnetic field (N and S poles) of the solar cell to mutually cut to form electromagnet.

1 Claim, 4 Drawing Sheets

USING SOUND WAVES AND PHOTIC ENERGY FOR ELECTRIC POWER

BACKGROUND OF THE INVENTION

1. Field of the Invention

The present invention is related to an electric power generating and gaining device using sound waves and photic energy to generate magnetism together using a crystal microphone device providing a metallic film with metallic coil leading wires to sense and receive the frequency of external sound waves and pressure to form a vibratile magnetic field (N and S poles), using the magnetic field and leading wire thereof and the leading wire and coil magnetic field (N and S poles) of the solar cell to mutually cut to form electromagnet.

2. Description of the Related Art

Normal ways to convert natural energy to electric power mostly use solar devices or crystal microphone devices to continuously convert photic energy or sound wave frequency pressure to electric power and store or directly offer to use.

A solar cell device 1000 is a photoelectric semiconductor using the sun's rays to directly generate electric power. It mainly uses some elements, such as potassium, germanium, cesium, selenium, silicon, etc., to be illuminated by light to then release electrons, as shown in FIG. 1, a structural diagram of a prior art crystal silicon solar cell. It is known to be constituted of a substrate 10 providing a bottom electrode 101, P type silicon layer 102, N type silicon layer 103, non-reflective coating and top electrode 104, etc. P-N junction interface is used to induce an electrical field. There are a thin N type silicon layer 103 permitting light to pass through and an inner layer of P type silicon layer 102 on the interface to generate negative electrons and positive holes to be illuminated by light. By the action of P-N junction interface electric field, the negative electrons move toward the top electrodes 104, and the positive holes more toward the bottom electrodes 101 to output voltage and current.

In addition, a crystal microphone device 2000 is a device using sound wave frequency pressure to generate electricity mainly using some piezoelectric materials, such as quartz, $BatiO_3$ etc., between two pieces of metallic board. Pressure is applied on the two metallic boards to generate electrical charges, as shown in FIG. 2, a cross sectional diagram of the prior art crystal microphone device 2000. A hollow resonance room 201 in the middle of a frequency box 20 provides a seat 202 to provide inherent crystal 203 (piezoelectric material). A voltage output leading wire 203a is provided at the bottom thereof. On the top of the frequency 20 is provided a metallic film 204 which is mainly affected by the frequency of external sound waves to generate mechanical vibration on the surface to further cause the resonance room 201 inside of the frequency box 20 to form a space pressure to push the surface of the crystal 203 to generate electrical charges. The output leading wire 203a conducts the voltage thereof.

However, the above mentioned solar cell device 1000 and crystal microphone device 2000 both need specific photic energy or sound waves to generate current. The current amount is limited. Therefore, in order to make both devices generate a large amount of electrical energy, the inventor continuously thought over, studied, and experimented to finally mutually operate both devices to form another kind of magnetic field to form a large amount of electrical energy.

With regard to the structure, method, object, fashion, and spirit of the present invention, please make a reference to the following accompanying drawings and descriptions to fully understand the present invention.

SUMMARY OF THE INVENTION

The present invention is related to an electric power generating and gaining device using sound waves and photic energy to generate magnetism together using a crystal microphone device providing a metallic film with metallic coil leading wires to sense and receive the frequency of external sound waves and pressure to form a vibratile magnetic field (N and S poles), using the magnetic field and leading wire thereof and the leading wire and coil magnetic field (N and S poles) of the solar cell to mutually cut to form an electromagnet.

The present invention is related to an electric power generating and gaining device using sound waves and photic energy, referring to FIGS. 3 and 4, which has a solar cell device 1000 and a crystal microphone device 2000. Metallic coil leading wires 204a are provided on a surface of a metallic film 204 of the crystal microphone device 2000. One end of the metallic coil leading wires 204a is connected to a crystal 203 (piezoelectric material) of a resonance room 201 of a frequency box 20, and the other end is connected to leading wires 101a of a bottom electrode 101 of the solar cell device 1000. Thus, output leading wires 203a at the bottom of the crystal 203 are connected to leading wires 104a of a top electrode 104 of the solar cell device 1000, referring to FIG. 4, wherein the leading wires 104a of the solar cell device 1000 can provide coils 104b

DETAILED DESCRIPTION OF THE INVENTION

Figure 1:
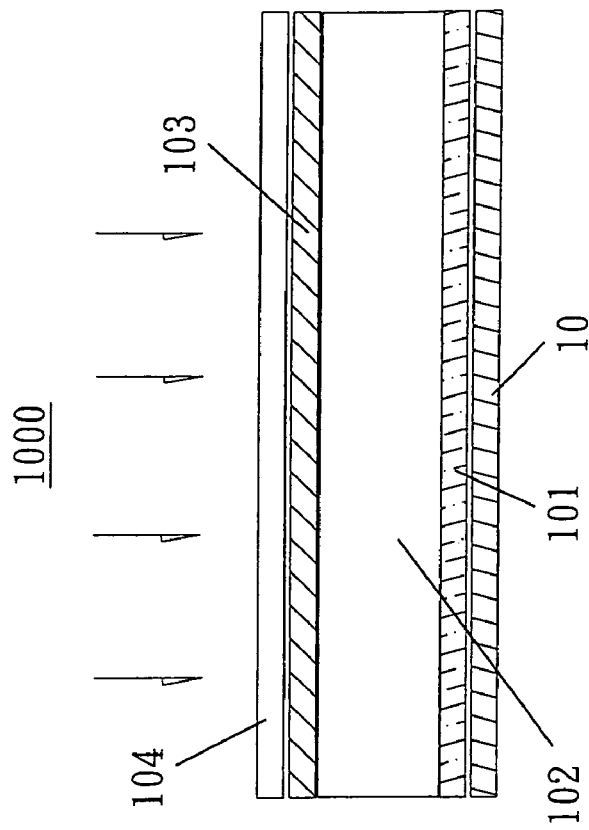
FIG. 1 is a structural diagram of a prior art crystal silicon solar cell.
Figure 2:
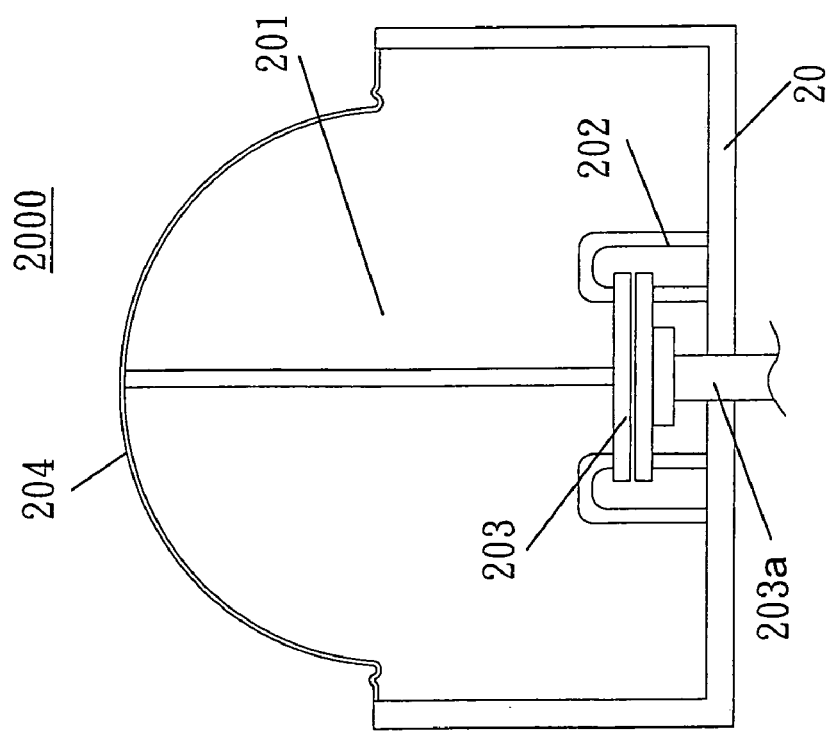
FIG. 2 is a cross sectional diagram of a prior art crystal microphone device.
Figure 3:
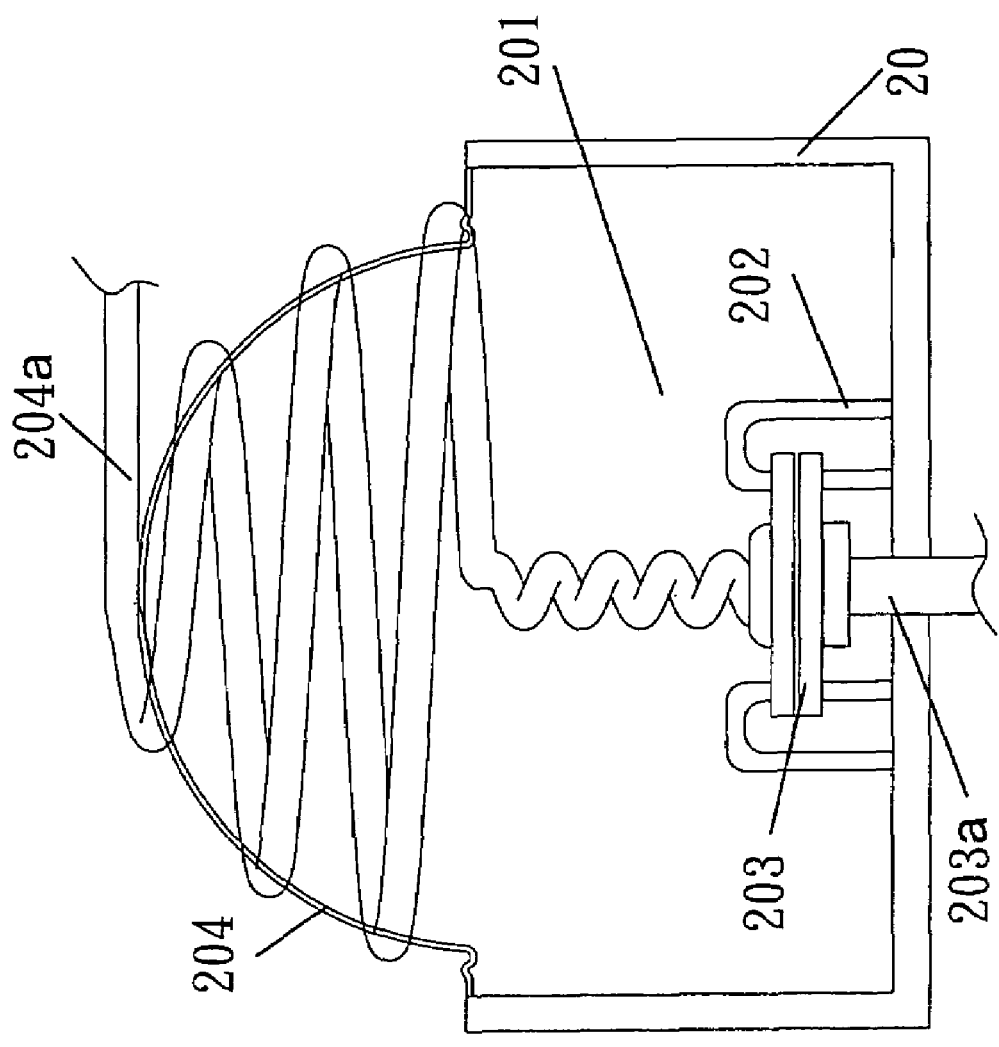
FIG. 3 is a cross sectional diagram of a crystal microphone device of the present invention.
Figure 4:
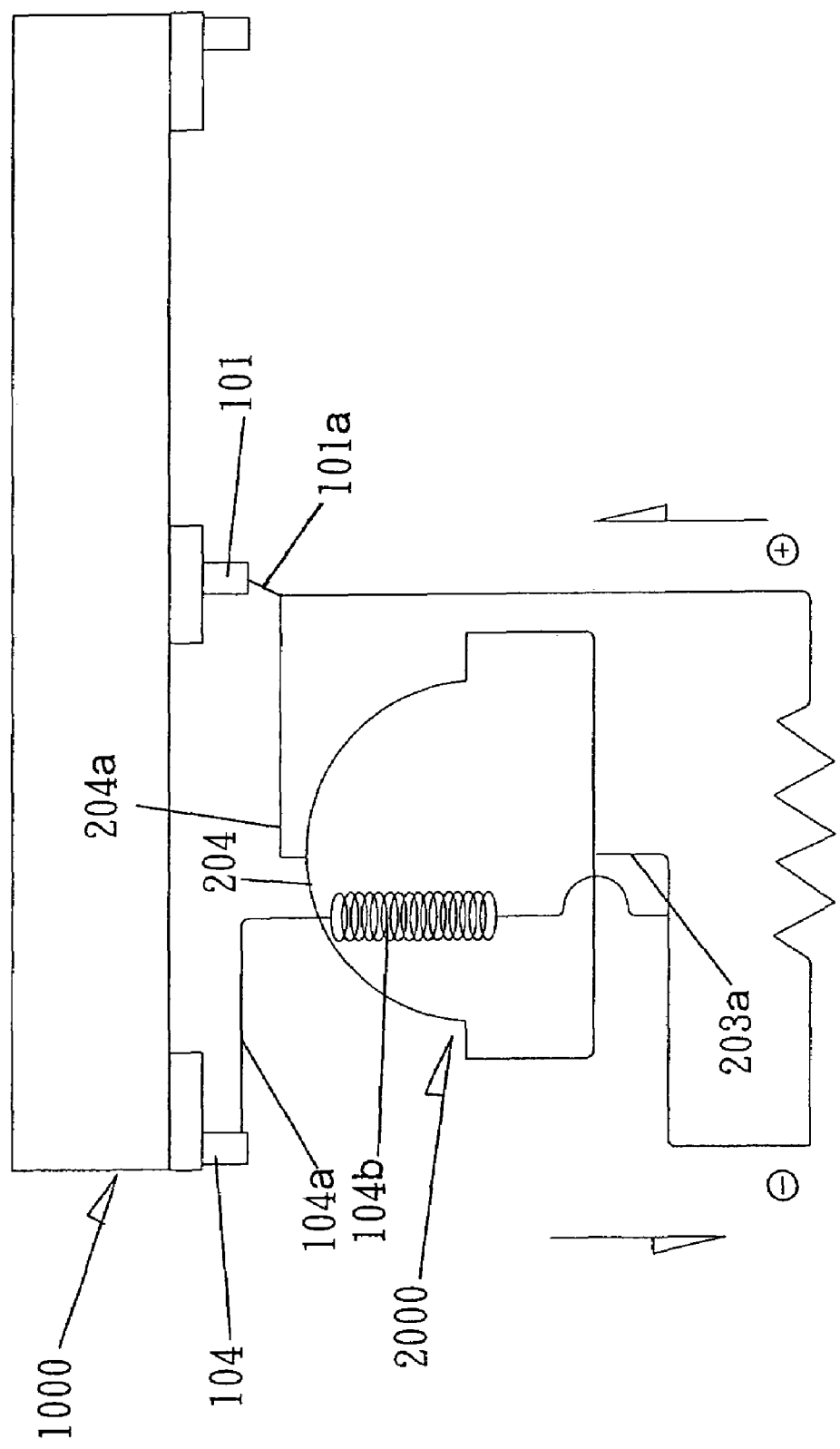
FIG. 4 is a diagram of a structural embodiment of the present invention.
Figure 6:
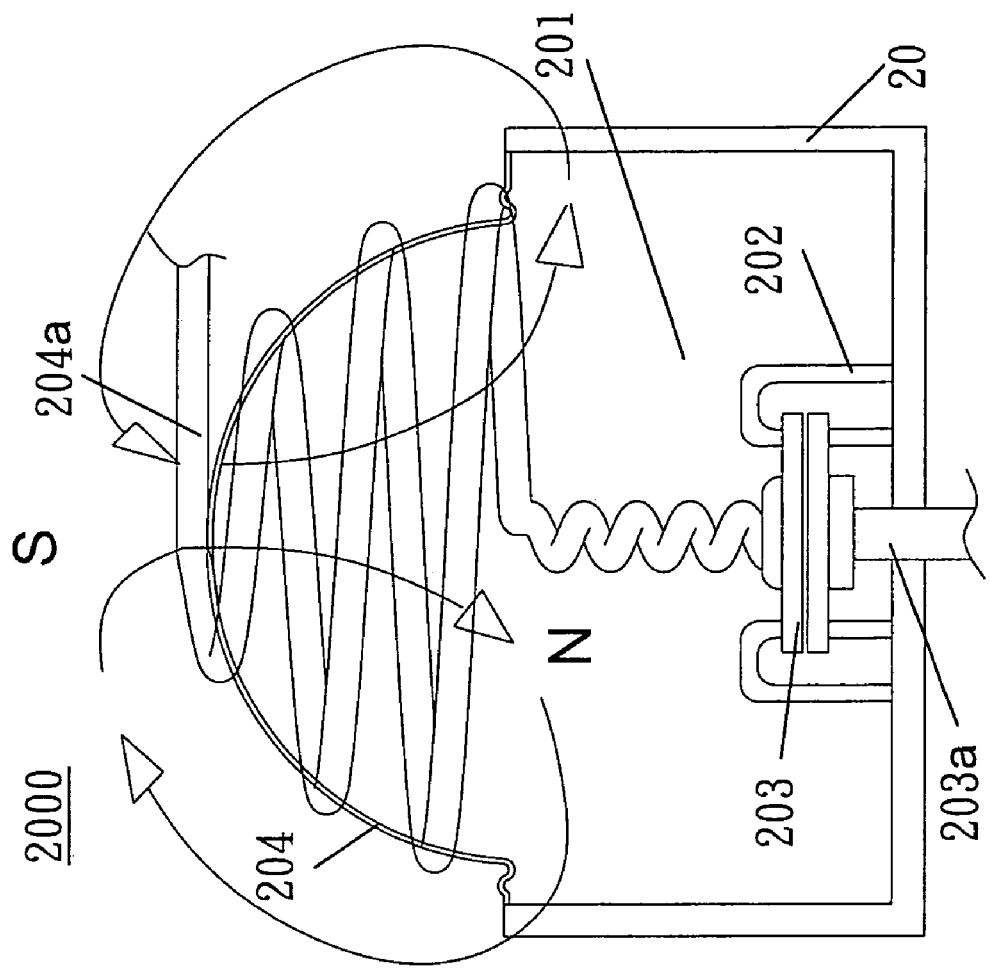
FIG. 6 is a diagram of a magnetic flux line of metallic coil leading wire of a metallic film of the present invention.
Figure 5:
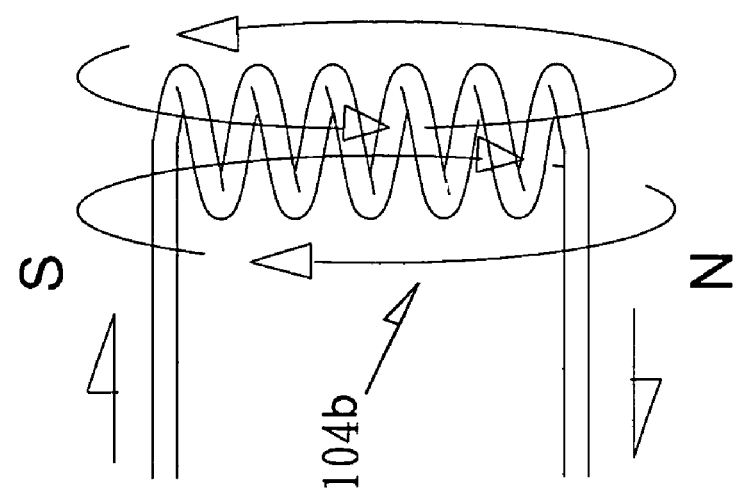
FIG. 5 is a diagram of a leading wire coil magnetic flux line of the present invention.

As shown in FIG. 4, a diagram of a structural embodiment of the present invention, further referring to FIG. 3 as well, a metallic film 204 of a crystal microphone device 2000 is affected by external sound wave frequency to form mechanical vibration to change space pressure of a resonance room 201 such that the surface of a crystal 203 generates electrical charges and output leading wires 203a outputs voltage. Further, metallic coil leading wires 204a of the vibrated metallic film 204 transmits current to form vibratile magnetic field, further referring to FIG. 6, to cut coils 104b, referring to FIG. 5, of leading wires 104a outputted by the solar cell device 1000 to sense and output current load. Meanwhile, the coils 104b of leading wires 104a outputted current generated by the solar cell device 1000 generates a magnetic field to mutually sense with a vibratile magnetic field, as shown in FIG. 6, of the metallic coil leading wires 204a of the metallic film 204 to cut and form a large number of electromagnets.

Accordingly, the structure of the present invention truly can achieve defined effect and was not disclosed before, meeting the patent requirements. We apply for patent protection and hope it can be granted.

It is appreciated that the above description is a preferred embodiment of the present invention. Any change made to the concept of the present invention without departing from the spirit covered by the specification and drawings that still falls into the scope of the present invention.

What is claimed is:

1. An electrical power generating and gaining device using sound waves and photic energy to generate magnetism comprising:
   a solar cell device; and
   a crystal microphone device including:
   a metallic film surface of the crystal microphone device providing metallic coil leading wires, one end of which are connected to a crystal of a resonance room in a natural frequency box and the other end of which is connected to a leading wire of a bottom electrode of the solar cell device so that an output leading wire below the crystal is connected to a leading wire of a top electrode of the solar cell device, wherein the leading wire of the solar cell device provides coils, and when mechanical vibration of the metallic film of the crystal microphone device is formed by an external sound wave frequency, the metallic coils of the vibrated metallic film transmit current to form a vibratile magnetic field to intersect the output leading wire coils of the solar cell device to respond and output a load current, meanwhile the leading wire coils generate a magnetic field when the solar cell device outputs the current to mutually respond with the vibratile magnetic field of the metallic coil leading wires of the metallic film.

* * * * *